Oct. 1, 1946.  P. M. BARBER  2,408,593
ANIMAL TRAP
Filed Feb. 21, 1945
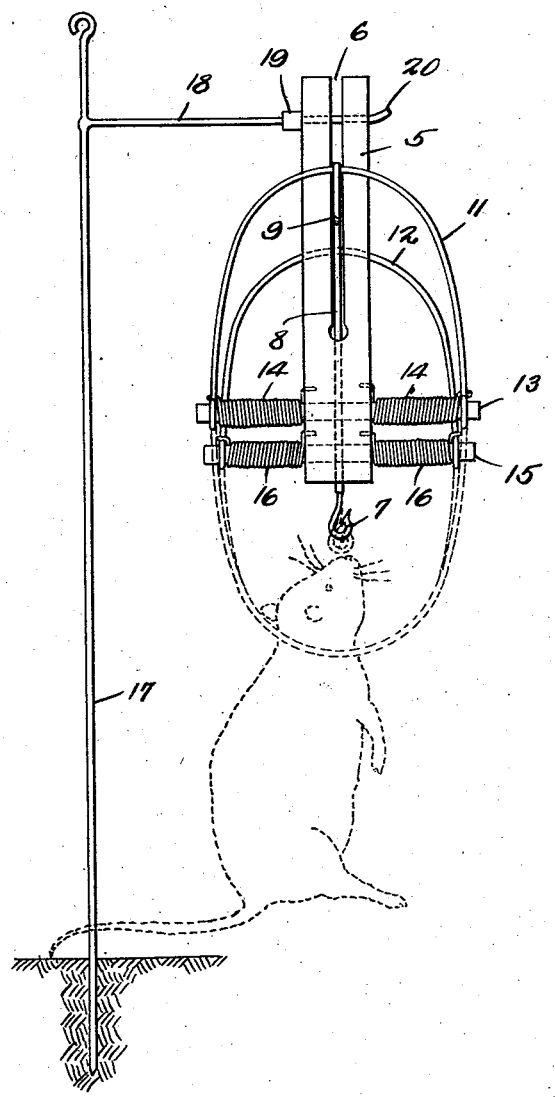
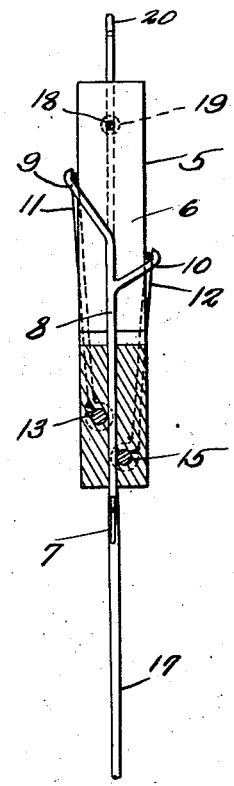
P. M. Barber
INVENTOR.
BY
ATTORNEYS.

Patented Oct. 1, 1946

2,408,593

UNITED STATES PATENT OFFICE 2,408,593

ANIMAL TRAP

Paul M. Barber, Aberdeen, S. Dak.

Application February 21, 1945, Serial No. 578,967

1 Claim. (Cl. 43—89)

This invention relates to animal traps, the primary object of the invention being to provide a trap embodying a pair of pivoted jaws so disposed that an animal setting off the trap, would necessarily have to be caught at the neck, the jaws acting with such force that the animal caught therein, will be instantly killed, resulting in less suffering for the animal, and with comparatively little damage to the animal's fur.

Another object of the invention is to provide a trap which may be employed in catching animals, birds or fish, the construction of the trap being such that it may be easily set without danger of injury to the hands of the person setting the trap.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing

Figure 1 is an elevational view illustrating a trap constructed in accordance with the invention, the jaws of the trap being shown as gripping the neck of an animal attempting to remove the bait from the bait hook of the trap.

Figure 2 is a longitudinal sectional view through the trap.

Referring to the drawing in detail, the body portion of the trap is indicated by the reference character 5 and comprises an elongated block formed with a central longitudinal bore. The body portion 5 is formed with a slot 6, which extends transversely therethrough, from the upper end thereof to a point in spaced relation with the lower end of the body portion, as clearly shown by Figure 1 of the drawing.

The bait hook is indicated by the reference character 7 and is mounted on the lower end of the rod 8, which is disposed within the bore. One end of the rod 8 extends laterally at 9, the length of the end 9 being such that the extremity thereof will extend beyond the front surface of the body portion. As shown, the end 9 moves longitudinally of the slot 6.

Below the end 9, is an upwardly and outwardly extended arm 10 which also forms a part of the rod 8, the arm 10 being extended rearwardly through the slot 6, the extremity thereof being disposed beyond the rear surface of the body portion.

The trap also includes a pair of jaws 11 and 12, the jaw 11 having eyes at its ends that are fitted over the ends of the pin 13. Coiled springs 14 are coiled around the pin 13 one end of each of the springs being anchored to the body portion 5, while the opposite ends of the springs are wrapped around the jaw 11 so that when the jaw is moved to its set position as shown by Fig. 1 of the drawing, the spring will be placed under tension to urge the jaw downwardly, when released.

The jaw 12 is formed with eyes at its ends, in which the pin 15 is disposed so that the jaw may pivot thereon. The jaw 12 however, is so arranged that when in its normal set position, the jaw 12 engages the body portion 5 at the side opposite to the jaw 11. Coiled springs 16 are mounted on the pin 15, and have their outer ends wrapped around the jaw 12 adjacent to the eyes thereof, the opposite ends of the springs 16 being anchored to the body portion 5 so that when the jaw 12 is moved upwardly to a position as shown by Fig. 1 of the drawing, the springs 16 will be tensioned.

The end 9 and arm 10 of the rod 8, provide the trigger, the end 9 of the rod being designed to fit over the jaw 11, as shown by Fig. 2, while the arm 10 is arranged to fit over the jaw 12. To set the trap, it is only necessary to swing the jaws 11 and 12 upwardly, to the positions shown by Fig. 2 of the drawing. The rod 8 is now moved upwardly until the end 9 thereof engages the jaw 11, and the arm 10 engages the jaw 12. It is obvious that bait placed on the bait hook will attract animals. The animal in an effort to remove the bait from the bait hook, will pull the rod 8 downwardly, releasing the jaws which swing together from opposite sides of the body portion, gripping an animal between the jaws, in a manner as shown by Fig. 1.

The trap also includes a supporting rod indicated by the reference character 17, the rod being provided with a laterally extended arm 18 which is provided with a stop 19 at a point adjacent to the free end thereof. The extremity of the arm 18 bends upwardly as at 20, so that when the arm is positioned in the openings formed in the upper end of the body portion for the reception of the arm 18, the arm will not slide therefrom. When the trap is positioned for use, the rod 17 is forced into the ground surface as shown by Fig. 1, and the body portion 5 is hung on the arm 18. The jaws 11 and 12 are now swung upwardly to the full line positions in Fig. 1 of the drawing, and the rod 8 is moved upwardly until the end 9 thereof and arm 10 thereof engage their respective jaws, holding the jaws in their set positions. When the rod moves downwardly, the jaws will be freed, and the springs will move the jaws to the dotted line positions shown by Fig. 1, catching the animal attempting to remove the bait therefrom.

While I have shown and described the trap for use in catching animals, it is to be understood that the trap may be used in catching fish or birds, with equally as satisfactory results.

What is claimed is:

An animal trap comprising an elongated body portion having a central longitudinal bore extending from one end of said body portion, said body portion having a slot extending transversely therethrough and communicating with the bore, a rod slidably mounted within the bore and slot, one end of said rod extending laterally through the slot, an arm extending from the rod and passing through the slot at the opposite side of the body portion, and a pair of swinging jaws pivotally connected with the body portion and adapted to swing beyond one end of the body portion, one of said jaws adapted to engage the end of the rod, the opposite jaw adapted to engage the arm secured to the rod, holding the jaws in their set positions, said rod adapted to move downwardly releasing the jaws, and said jaws adapted to swing into gripping relation with respect to each other.

PAUL M. BARBER.